United States Patent Office 2,987,957
Patented June 13, 1961

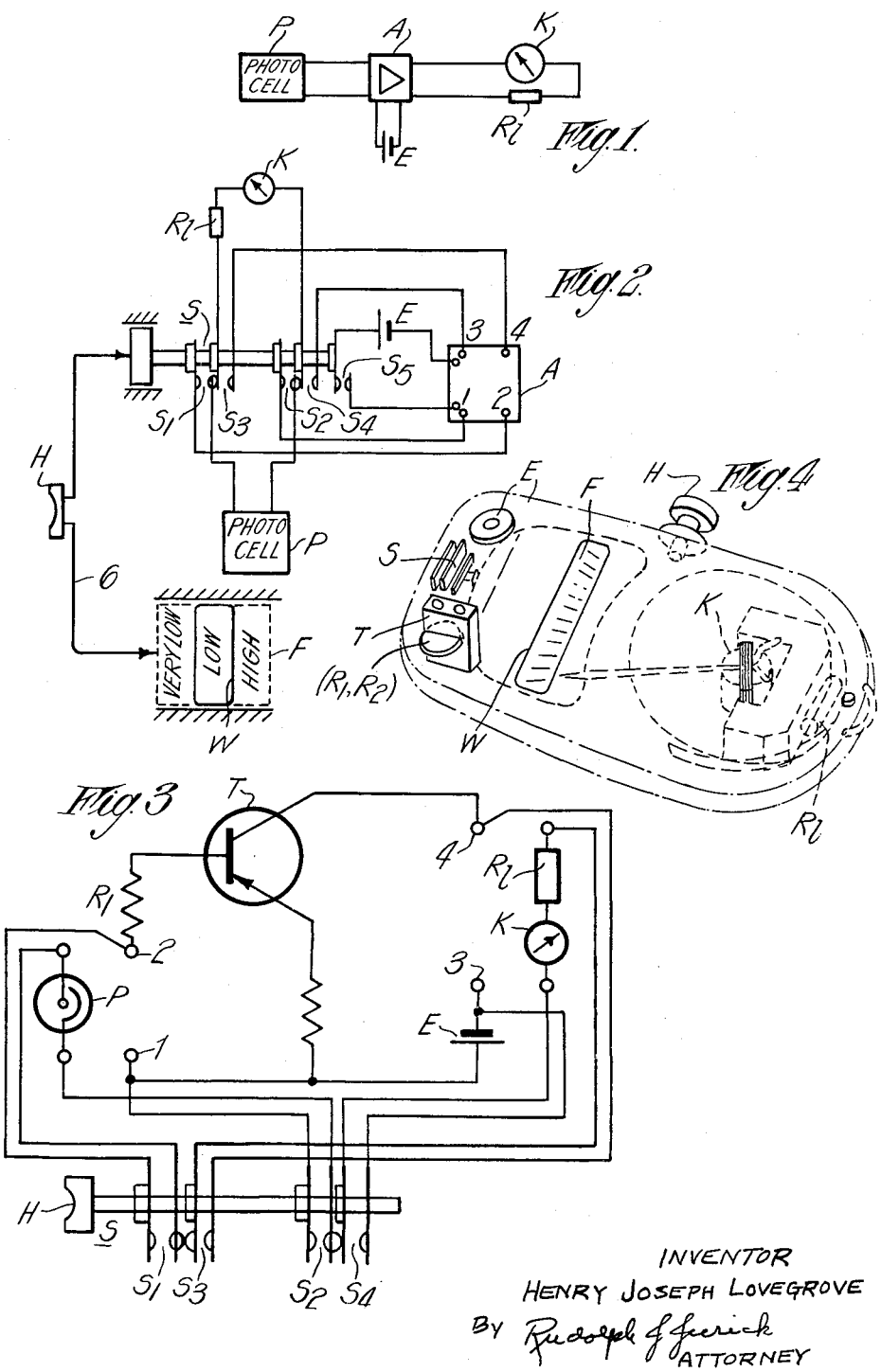

2,987,957
LIGHT-SENSITIVE EXPOSURE METERS
Henry Joseph Lovegrove, Hadley Wood, Barnet, England, assignor, by mesne assignments, to Daystrom, Incorporated, Murray Hill, N.J., a corporation of New Jersey
Filed Mar. 18, 1957, Ser. No. 646,805
Claims priority, application Great Britain July 5, 1956
1 Claim. (Cl. 88—23)

The invention relates to light-sensitive exposure meters and the like devices and more particularly to amplifying arrangements for such meters.

Light-sensitive exposure meters used in photography are required to give a reliable indication of exposure factors under widely different conditions of light and scene brightness. It is known however that the response curve of the barrier-layer type of photo-electric cells, which are frequently used in conjunction with sensitive moving coil instruments in photographic exposure meters, is not uniform with respect to the intensity of the incident light, and that it is difficult to obtain reliable readings with very low light intensities. Various devices have been adopted to assist in obtaining a practical basis for scale calibration of the indicating instrument, such as variable masking of the cell aperture and the use of resistances in the electrical circuit. Such devices are effective for the higher scales of light intensity but do not solve the problem for the low values, and, with known devices, there is still a limit below which it is not possible to obtain accurate readings of light intensity. It is an object of the invention to overcome this difficulty and to provide means for obtaining reliable indications at extremely low light intensities as well as with average and high light intensities in a single instrument.

The arrangement according to the invention comprises a light-sensitive cell of the self-generating type and a sensitive moving-coil type indicating instrument responsive to the output of the cell, and a transistor amplifier connectable between the cell and the moving coil instrument so as to provide an amplified output at the lower intensities. A source of E.M.F. for the biasing voltages of the transistor circuit is provided by a miniature dry battery and a suitable selector switch is operable to disconnect the battery and the transistor amplifier when not required so that the photocell output is fed direct to the indicating instrument. In order to make the best use of the resolution obtained by the amplifier it will normally be necessary to provide an additional scale on the indicating instrument, which may be designated "very low," such scale being calibrated to suit the sensitivity of the cell at the low intensities, and a mechanical device for selecting the appropriate scale may be ganged with the amplifier selector switch so that operation of a single control, e.g. a push button, will connect the amplifier and battery in circuit and at the same time place the appropriate "low intensity" scale before a viewing aperture in the instrument casing.

One example of an arrangement according to the present invention in a photographic exposure meter will now be more fully described with reference to the accompanying drawings.

FIG. 1 is a simple block schematic of the circuit arrangement including the amplifier, FIG. 2 is a more detailed schematic showing the connections between the selector switch and the various other components and the principle of the mechanical connection between the selector switch and the triple range scale, FIG. 3 indicates a transistor amplifier circuit, and FIG. 4 indicates the general layout of the components in the instrument casing.

FIGURE 1 shows the circuit of the exposure meter connected for operation with the "very low" scale. The photo-electric cell P of the self-generating type is shown connected to the input of a transistor amplifier A having a battery E for supplying the necessary biasing potentials, whilst the output of the amplifier is connected to the moving coil instrument K with which a fixed resistor $R_1$ is connected in series.

The diagram of FIGURE 2 shows the switching arrangement for simultaneously connecting the amplifier and for changing the range of the moving coil instrument K.

A multiple leaf selector switch S, comprising an axially-movable operating shaft, is fitted with two pairs of contacts $s1$ and $s2$ each comprising a stationary element and a movable element, the movable elements being shown in the form of leaves generally perpendicular to the shaft axis and carried by collars on said shaft. When push button H is pressed these movable elements engage the associated stationary elements and connect the photocell P to the input terminals 1 and 2 of the transistor amplifier A provided with a biasing battery E. Two further pairs of contacts $s3$ and $s4$ each comprising a stationary element and a movable element, the movable elements being shown in the form of leaves generally perpendicular to the shaft axis and carried by collars on said shaft, at the same time serve to connect the moving coil instrument K and its series resistor $R_1$ to the output terminals of the amplifier numbered 3 and 4. A further contact $s5$ comprising a stationary element and a movable element, the movable element being shown in the form of a leaf generally perpendicular to the shaft axis and carried by a collar on the right hand end portion of said shaft, may be included which normally isolate the biasing battery E, and connect it in circuit when button H is pressed.

F indicates a movable scale plate engraved with three different sets of scale markings designated "very low," "low" and "high" respectively. This triple range scale plate F is ganged to the operating shaft of the selector switch S by a suitable mechanical linkage represented by 6 so that operation of the push button H will close the pairs of contacts $s1$ to $s5$ above referred to, thus connecting the amplifier circuit and at the same time will place the scale range marked "very low" under a viewing window W of the indicating instrument K.

It will be understood that when the switch and the scale plate are in the position shown in the drawing the exposure meter operates without the amplifier and gives an indication on the scale range designated "low."

Push button H has a third position to the left of that shown in the drawing in which the scale range marked "high" is visible and in which the shaft of the switch S moves to the left whilst the sets of contacts above referred to remain in the position shown in the drawing with the amplifier disconnected.

FIGURE 3 shows in more detail a circuit diagram of the transistor amplifier from which it is seen that closure of the pairs of contacts $s1$ to $s4$ will place the biasing battery E in circuit to supply appropriate biasing potentials to the electrodes of a p-n-p junction transistor element T. In this diagram the contacts $s5$ have been omitted. The resistors R1 and R2 are inserted in the leads to the base electrode and the emitter electrode to obtain the proper operating potentials, and one or both of these resistors may be adjustable.

FIGURE 4 shows the general layout of the components in the casing D of the exposure meter, the various circuit elements being indicated by the same references as in FIGURES 1 to 3. All of the components comprising the photographic exposure meter are contained within the single casing D, which may be of shallow or flattened box form having the sensitive surface of the photoelectric cell exposed through a window at one major side of the casing, this being not visible in the drawing, and at the other side the window W revealing the calibrated scale card F over which moves the pointer J of the miniature moving coil instrument K, which may be of a known type. In order to achieve a convenient physical arrangement of the components and the connections between the various components, the transistor element T with the miniature battery E and biasing resistors R1 and R2 for supplying the biasing potentials thereto and the selector switch, which may conveniently be in the form of a multiple leaf switch, for switching the amplifier in and out of the circuit, are all arranged in juxtaposition at one end of the instrument casing. The transistor element T or elements used in the transistor amplifier may be housed in an aluminum casing together with the bias resistances R1 and R2 for the electrodes thereof. Suitable types of transistors may be used for direct current amplification. For example, in the present application the amplifier may be a single stage amplifier with grounded emitter. Alternatively one or other of the suitable types of double stage direct-coupled amplifiers may be employed.

I claim:

A photographic exposure meter comprising a light-sensitive cell of the self-generating type, a moving coil indicating instrument responsive to the cell output, a transistor amplifier, a biasing battery therefor, and manual switching means for connecting the transistor amplifier into circuit between the light-sensitive cell and the indicating instrument, said manual switching means being a multiple-leaf switch with an operating shaft axially movable between inner and outer positions, three scales for said meter, one for high, one for low and one for very low inputs, and common control means for said operating shaft and scales, whereby when the operating shaft is in its outer position the high scale is exposed and the transistor amplifier disconnected; when said shaft is in an intermediate position the low scale is exposed and the amplifier still disconnected; and when said shaft is in its inner position the very low scale is exposed and the cell connected to the input terminals of the transistor amplifier and the output terminals of said amplifier connected to said instrument; said connections being effected by making the multiple leaf switch as two pairs of contacts and a further contact, whereby when said shaft is moved to its innermost position, the cell is connected to input terminals of the transistor amplifier by one of the two pairs of contacts, the moving coil instrument at the same time is connected to the output terminals of the amplifier by the other of said two pairs of contacts, and the biasing battery is connected to the amplifier by said further contact, and wherein when said shaft is withdrawn to an intermediate position said connections to the amplifier are broken and the cell is connected directly to said instrument.

References Cited in the file of this patent

UNITED STATES PATENTS

| | | |
|---|---|---|
| 2,472,381 | McMaster | June 7, 1949 |
| 2,501,547 | Stimson | Mar. 21, 1950 |
| 2,542,299 | Archer et al. | Feb. 20, 1951 |
| 2,651,963 | Bischoff | Sept. 15, 1953 |
| 2,745,021 | Kurshan | May 8, 1956 |
| 2,897,720 | Offner | Aug. 4, 1959 |

FOREIGN PATENTS

| | | |
|---|---|---|
| 335,179 | Great Britain | Sept. 17, 1930 |